(12) United States Patent
Shanmugavadivel et al.

(10) Patent No.: US 10,863,358 B2
(45) Date of Patent: *Dec. 8, 2020

(54) THREAT INDEX BASED WLAN SECURITY AND QUALITY OF SERVICE

(71) Applicant: Sophos Limited, Abingdon (GB)

(72) Inventors: Senthilraj Shanmugavadivel, Coimbatore (IN); Dirk Bolte, Birkenfeld (DE); Shail Talati, Santa Clara, CA (US)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,526

(22) Filed: Nov. 21, 2019

(65) Prior Publication Data

US 2020/0092725 A1   Mar. 19, 2020

Related U.S. Application Data

(63) Continuation of application No. 15/649,548, filed on Jul. 13, 2017, now Pat. No. 10,524,130.

(51) Int. Cl.
*H04W 12/12* (2009.01)
*H04W 12/08* (2009.01)
(Continued)

(52) U.S. Cl.
CPC ............. *H04W 12/08* (2013.01); *H04L 63/10* (2013.01); *H04L 63/1441* (2013.01);
(Continued)

(58) Field of Classification Search
None
See application file for complete search history.

(56) References Cited

U.S. PATENT DOCUMENTS 7,327,960 B1   2/2008 Billhartz
7,336,670 B1 *  2/2008 Calhoun ................. H04L 63/14
                                                          370/401
(Continued)

FOREIGN PATENT DOCUMENTS

CN   103916859   7/2014
CN   107241354   10/2017

OTHER PUBLICATIONS

Applying TCP Profiling to Detect Wireless Rogue Access Point. Yu et al. (Year: 2014).*

(Continued)

*Primary Examiner* — Venkat Perungavoor
(74) *Attorney, Agent, or Firm* — IP Spring

(57) ABSTRACT

Implementations generally relate methods, systems, and computer readable media for providing threat index based wireless local area networks (WLAN) security and quality of service. In one implementation, a method includes receiving a request from a client device connected to a network via a network link. The method further includes determining a threat index value for the client device. The method further includes determining one or more security policies associated with one or more respective network resources, where each security policy applies one or more rules for allocating one of the network resources. The method further includes determining allocation of one or more of the network resources to the client device based on the one or more security policies and the threat index value.

20 Claims, 9 Drawing Sheets

(51) Int. Cl.
*H04L 29/06* (2006.01)
*H04W 72/04* (2009.01)
*H04W 28/16* (2009.01)
*H04W 84/12* (2009.01)

(52) U.S. Cl.
CPC ............ *H04L 63/20* (2013.01); *H04W 12/12* (2013.01); *H04W 72/04* (2013.01); *H04L 63/0272* (2013.01); *H04W 84/12* (2013.01)

(56) References Cited

U.S. PATENT DOCUMENTS

| | | | | |
|---|---|---|---|---|
| 7,969,950 | B2* | 6/2011 | Iyer | H04W 24/00 370/338 |
| 8,832,832 | B1 | 9/2014 | Visbal | |
| 9,100,428 | B1 | 8/2015 | Visbal | |
| 10,368,360 | B1* | 7/2019 | Dash | H04L 12/2803 |
| 2005/0192902 | A1 | 9/2005 | Williams | |
| 2006/0153153 | A1* | 7/2006 | Bhagwat | H04K 3/94 370/338 |
| 2007/0143851 | A1 | 6/2007 | Nicodemus et al. | |
| 2008/0209517 | A1 | 8/2008 | Nightingale | |
| 2009/0119741 | A1 | 5/2009 | Palnitkar et al. | |
| 2011/0167491 | A1 | 7/2011 | Ruggerio | |
| 2012/0233656 | A1* | 9/2012 | Rieschick | H04W 12/08 726/1 |
| 2013/0347073 | A1* | 12/2013 | Bryksa | H04L 63/105 726/4 |
| 2015/0092574 | A1* | 4/2015 | Kuan | H04W 12/1202 370/252 |
| 2015/0281277 | A1 | 10/2015 | May et al. | |
| 2016/0094565 | A1 | 3/2016 | Adams et al. | |
| 2016/0183093 | A1 | 6/2016 | Vaughn | |
| 2016/0359917 | A1 | 12/2016 | Rao et al. | |
| 2017/0126740 | A1 | 5/2017 | Bejarano Ardila et al. | |
| 2017/0339190 | A1 | 11/2017 | Epstein et al. | |
| 2019/0297546 | A1* | 9/2019 | Likar | H04W 36/00835 |

OTHER PUBLICATIONS

USPTO, Final Office Action for U.S. Appl. No. 15/649,548, dated Jun. 12, 2019, 15 Pages.
USPTO, Notice of Allowance for U.S. Appl. No. 15/649,548, dated Aug. 29, 2019, 21 Pages.
Boob, S. et al., "Wireless Intrusion Detection System", International Journal of Computer Applications, vol. 5—No. Aug. 8, 2010, 5 Pages.
EPO, International Search Report and Written Opinion for International Patent Application No. PCT/GB2018/051988, dated Oct. 30, 2018, 12 pages.
EPO, Invitation to Pay Additional Fees and, Where Applicable, Protest Fee for International Patent Application No. PCT/GB2018/051988, Sep. 6, 2018, 8 pages.
Han, H. et al., "A Measurement Based Rogue AP Detection Scheme", IEEE, 2009, 9 pages.
Juniper, "Understanding Rogue Clients", Retrieved from the Internet: https://www.juniper.net/documentation/en_US/junos-space-apps/network-director1.6/topics/concept/wireless-rogue-client.html (retrieved on Aug. 29, 2018), Jun. 30, 2014, 2 pages.
Pattar, S. "Detection of Rogue Access Points Resent in the WLAN at the Server Side", Proceedings of IRF International Conference, Pune India, Feb. 23, 2014, 4 Pages.
USPTO Non-final Office Action for U.S. Appl. No. 15/649,548, dated Mar. 1, 2019, 10 pages.
Venkataraman, A. et al., "Rogue Access Point Detection Using Innate Characteristics of the 802.11 MAC", SecureComm, 2009, pp. 394-416.

* cited by examiner

US 10,863,358 B2

THREAT INDEX BASED WLAN SECURITY AND QUALITY OF SERVICE

CROSS-REFERENCE TO RELATED APPLICATIONS

This application is a continuation under 35 U.S.C. § 120 of U.S. patent application Ser. No. 15/649,548 filed on Jul. 13, 2017. The disclosure of U.S. patent application Ser. No. 15/649,548 is hereby incorporated by referenced in its entirety.

BACKGROUND

In network environments, securing a mission critical network such as a network of Internet of Things (or IoT) devices is a concern. One risk is that unrelated systems may be connected on the same network and if an attacker gains unauthorized access to a given device, the attacker could harm that device and other devices on the same or on different connected networks associated with the given device.

A variety of endpoint security solutions with a firewall may apply security polices at different network segments. Devices employing such security solutions, however, may be disconnected in terms of management and applied polices. As such, applying a security policy at each network segment may help, but it may not be feasible to secure a whole ecosystem of devices. As such, security is a substantial challenge in providing secure networks.

SUMMARY

Implementations generally relate to methods, systems, and computer readable media for providing threat index based wireless local area networks (WLAN) security and quality of service. In one implementation, a method includes receiving a request from a client device connected to a network via a network link. The method further includes determining a threat index value for the client device. The method further includes determining one or more security policies associated with one or more respective network resources, where each security policy applies one or more rules for allocating one of the network resources. The method further includes determining allocation of one or more of the network resources to the client device based on the one or more security policies and the threat index value.

With further regard to the method, in some implementations, the threat index value is based on a threat level of the client device, where the threat level is provided by a wireless access point. In some implementations, the threat index value is changeable at any time. In some implementations, the method further includes determining a threat level of the client device based on one or more characteristics of the client device, and assigning a threat level index value for the client device based on the threat level. In some implementations, one of the network resources includes virtual local area network (VLAN) assignments, where the method further includes applying one of the security policies to the VLAN assignments based on the threat index value. In some implementations, one of the network resources includes airtime, where the method further includes applying one of the security policies to airtime allocation based on the threat index value. In some implementations, one of the network resources includes band steering, and where the method further includes applying one of the security policies to the band steering based on the threat index value. In some implementations, one of the network resources includes service set identifier (SSID) steering, where the method further includes applying one of the security policies to the SSID steering based on the threat index value.

In some implementations, a system includes one or more processors coupled to a computer-readable medium having stored thereon software instructions that, when executed by the one or more processors, cause the one or more processors to perform operations including receiving a request from a client device connected to a network via a network link; determining a threat index value for the client device; determining one or more security policies associated with one or more respective network resources, where each security policy applies one or more rules for allocating one of the network resources; and determining allocation of one or more of the network resources to the client device based on the one or more security policies and the threat index value.

With further regard to the system, in some implementations, the threat index value is based on a threat level of the client device, where the threat level is provided by a wireless access point. In some implementations, the operations further include determining a threat level of the client device based on one or more characteristics of the client device, and assigning an index value for the client device based on the threat level. In some implementations, one of the network resources includes VLAN assignments, where the operations further include applying one of the security policies to the VLAN assignments based on the threat index value. In some implementations, one of the network resources includes airtime, where the operations further include applying one of the security policies to airtime allocation based on the threat index value. In some implementations, one of the network resources includes band steering, where the operations further include applying one of the security policies to the band steering based on the threat index value. In some implementations, one of the network resources includes SSID steering, where the operations further include applying one of the security policies to the SSID steering based on the threat index value.

In some implementations, a non-transitory computer-readable storage medium having stored thereon software instructions that, when executed by one or more processors, cause the one or more processors to perform operations including receiving a request from a client device connected to a network via a network link; determining a threat index value for the client device; determining one or more security policies associated with one or more respective network resources, where each security policy applies one or more rules for allocating one of the network resources; and determining allocation of one or more of the network resources to the client device based on the one or more security policies and the threat index value.

With further regard to the computer-readable storage medium, in some implementations, the threat index value is based on a threat level of the client device, where the threat level is provided by a wireless access point. In some implementations, the operations further include determining a threat level of the client device based on one or more characteristics of the client device, and assigning an index value for the client device based on the threat level. In some implementations, one of the network resources includes VLAN assignments, where the operations further include applying one of the security policies to the VLAN assignments based on the threat index value. In some implementations, one of the network resources includes airtime, where the operations further include applying one of the security policies to airtime allocation based on the threat index value.

DETAILED DESCRIPTION

Implementations generally relate to methods, systems and computer readable media for providing threat index based WLAN security and quality of service. This disclosure is generally in the context of network devices and network security devices such as gateways, hubs, switches, firewalls, and wireless access points (APs), and generally relates to security policies. Implementations enable protected WLAN decisions based on threat indexes. In one implementation, a system such as a device security system receives a request from a client device connected to a network via a wireless link. The system determines a threat index value for the client device. The system further determines one or more security policies associated with one or more respective network resources, where each security policy applies one or more rules for allocating network resources. The system further determines allocation of one or more of the network resources to the client device based on the one or more security policies and the threat index value.

As described in more detail herein, a security policy may be a configuration or setting that configures a device with permissions, access, rules, and settings associated with traffic, content, packets, data, applications, devices, and other network aspects.

While some implementations are described herein in the context of WLANs, these implementations and others may also apply to local area networks (LANs) and radio frequency (RF) technologies. For example, techniques described herein may be implemented on any L2 network device, including hubs and switches.

Figure 1:
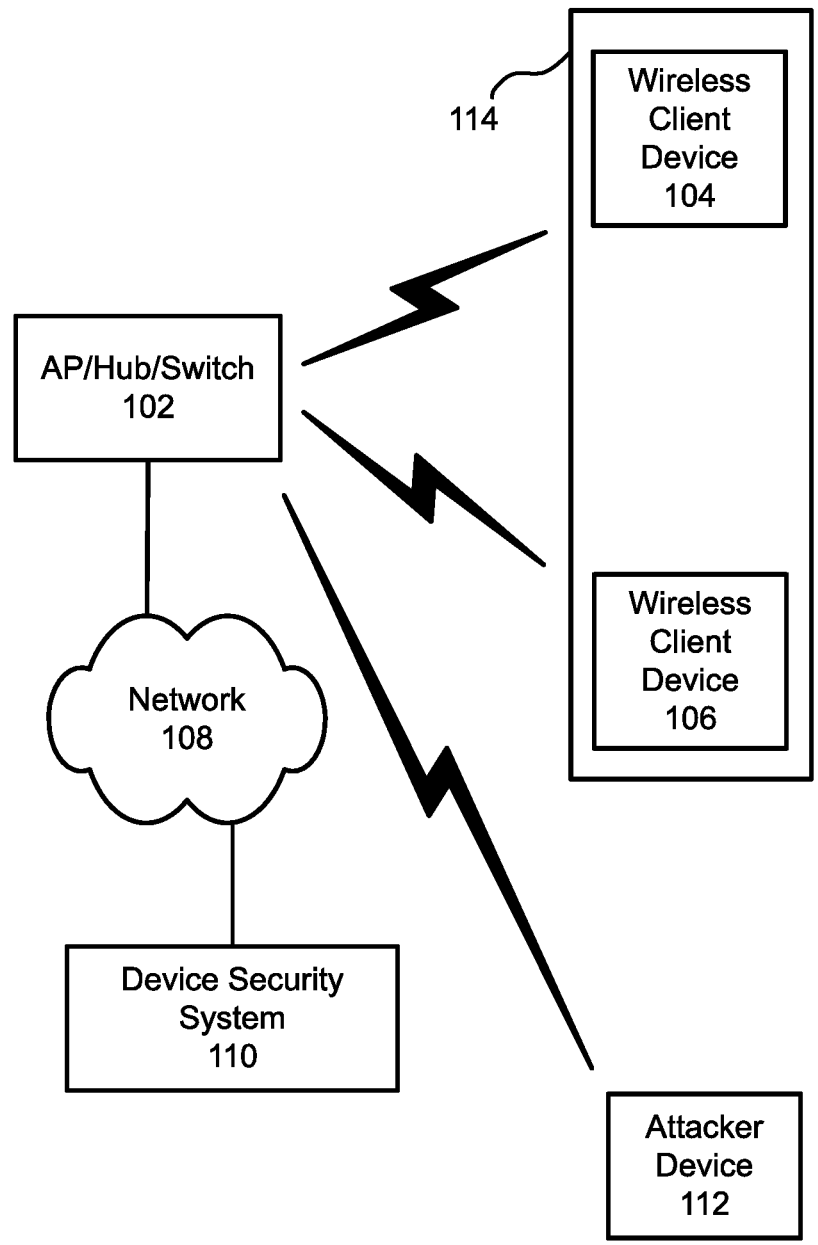
FIG. 1 illustrates a block diagram of an example wireless network environment, which may be used for some implementations described herein.

FIG. 1 illustrates a block diagram of an example wireless network environment 100, which may be used for some implementations described herein. The environment 100 includes a wireless access point (AP) or hub or switch 102 (AP/hub/switch 102), wireless client devices 104 and 106, a network 108, and a device security system 110. In some implementations network 108 may include one or more networks (e.g., 802.11 networks, Wi-Fi, Bluetooth, etc.). The wireless client devices 104 and 106 may be referred to as client devices 104 and 106, or clients 104 and 106. As described in more detail herein, the device security system 110 protects the wireless network environment 100 from attacker devices such as attacker device 112.

For ease of illustration, FIG. 1 shows one block for each of the AP/hub/switch 102, the client device 104, the client device 106, the network 108, the device security system 110, and the attacker device 112. Any of blocks 102 through 112 may represent multiple devices. For example, there may be any number of client devices. In some implementations, wireless network environment 100 may not have all of the components shown and/or may have other elements including other types of elements instead of, or in addition to, those shown herein. In various implementations, users may interact with each other or with other systems using the respective client device 104 and the client device 106. In various implementations, client devices 104, 106 may be a desktop computer, laptop computer, tablet, mobile telephone, Internet of Things (IoT) devices or any other suitable device. In various implementations, client devices 104 and 106 may interact with each other as IoT devices or may interact with other systems such as or via the AP/hub/switch 102. IoT devices may include devices in an office environment, home environment, and other locations. For example, IoT devices may include printers, shredders, fax machines, smoke detectors, fire alarms, locks, security cameras, proximity sensors, smart appliances, microwaves, stoves, refrigerators, food processors, thermostats, locks, etc.

In operation, the device security system 110 calculates a threat index value for each of the client devices 104 and 106. In various implementations, the threat index value may be based on various factors such as physical communication layer characteristics (e.g., RF characteristics, etc.) of each of the corresponding client devices 104, 106, etc. The RF characteristics for the client devices 104 and 106 may be detected by the AP/hub/switch 102.

As described in more detail herein, if the threat index value for a given client device falls below a predetermined or dynamically determined threshold, the client device may be prevented from accessing the network 108 or may be provided with reduced network resources. In some implementations, the predetermined threshold may include a threat index value scaled to a given scale, e.g., such as 0-1, etc. In some implementations, the predetermined threshold may include one or more ranges of values (e.g., "1-3: low threat index"; "4-6: medium threat index"; and "7-9: high threat index").

It will be appreciated that the device security system 110 may be a separate device or integrated into another device, such as the AP/hub/switch 102. In some implementations, the client devices 104 and 106 may share a physical location 114 (e.g., within a building, etc.), while the attacker device 112 may have a different physical location. For example, devices in the same physical location may share one or more characteristics, e.g., RF characteristics such as angle-of-arrival for a wireless signal, received signal strength indicator (RSSI), networks detected as available, etc. Devices that are not in the same physical location may not share such characteristics.

Figure 2:
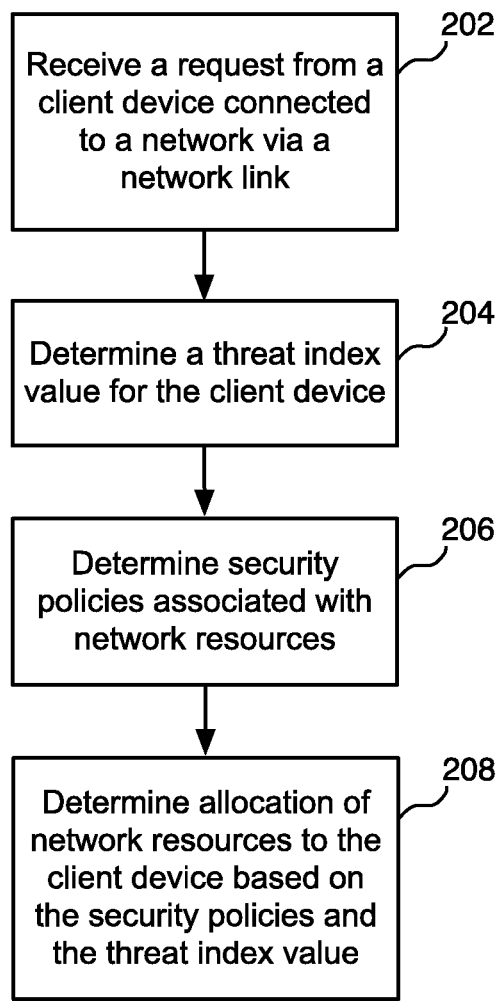
FIG. 2 illustrates a flowchart showing an example method for applying threat index based WLAN security and quality of service, according to some implementations.

FIG. 2 illustrates a flowchart showing an example method for applying threat index based WLAN security and quality of service, according to some implementations. Referring to FIGS. 1 and 2, a method is initiated at 202, where the system, such as device security system 110, receives a request from a client device connected to a network via a network link. For example, a client device such as the client device 104 may send a request to access the network to the AP/hub/switch 102, which forwards the request to the device security system 110. In some implementations, the network link may be a wireless link. In some implementations, the network link may be a wired link.

At 204, the system determines a threat index value for the client device. In some implementations, the threat index value may be based on a threat level of the client device. In some implementations, the threat level may be provided by a wireless access point. In some implementations, the threat index may be determined and also may be changed at any time based on various factors (e.g., on initial connect, on/during ongoing network communication, etc.). In some implementations, the threat index may be determined and also may be changed at any time asynchronously to a particular connection (e.g., when triggered over the threat management facility, etc.).

In some implementations, the system may determine a threat level of the client device based on one or more characteristics of the client device. For example, some implementations may use physical communication layer characteristics of a device such as radio frequency (RF) characteristics and optionally higher-level characteristics (e.g., data transfer characteristics, etc.) to detect an attempt to breach network security or a network intrusion and to determine a threat level and assign a threat index value based on the threat level.

The RF characteristics may also include one or more of a received signal strength indicator (RSSI) value, an angle of signal arrival, power save characteristics, an SSID of the network that the device is connected to, a wireless access point or hub/switch that the device is connected to, a basic service set identifier (BSSID) associated with the device, a data transmission rate of the device, and data burst rate of the device.

In some implementations, additional characteristics may include threat level indicated/reported by a client itself using a locally installed software (e.g., an antivirus software, etc.), threat level indicated by a threat management facility using information such as status reported by a local client, policy state (e.g., outdated, up-to-date, etc.), a hardware or product version, an operating system (OS) version/patch level, which user is logged in, where the client was previously connected (e.g., whether it was connected to another unsafe network, etc.). In some implementations, characteristics may be determined passively, by observation of device activity, or actively, by interrogating the device or otherwise causing the device to react or respond. In some implementations, a secure heartbeat may be used to communicate characteristics of a device. Implementations for determining a threat level of a client device are described in more detail herein.

With regard to the physical communication layer characteristics, baseline characteristics of the client devices may include beamforming characteristics, which may not be matched by the attacker device due to the attacker device being in a different location. In some implementations, beamforming may refer to a particular configuration of a signal transmitted by the client device. For example, beamforming may be based on client location, such that different beamforming characteristics are used at different locations, e.g., to improve wireless data transfer between the client device and the AP. Devices that are at different locations have different beamforming characteristics. It may be difficult for an attacker device that is at a different location to replicate the beamforming characteristics of a client device.

The system may then assign a threat index value for the client device based on the threat level. In some implementations, the threat index value may be a color, where a predetermined color (e.g., green) indicates a safe client device, another predetermined color (e.g., yellow) indicates a questionable client device, and another predetermined color (e.g., red) indicates an unsafe client device. The particular colors and the number of colors may vary and will depend on the particular implementation. Other types of threat index value are possible (e.g., letters, etc.).

Referring again to FIG. 2, at 206, the system determines one or more security policies associated with one or more respective network resources. In various implementations, a security policy may be a configuration or setting that configures a device with permissions, access, rules, and settings associated with traffic, content, packets, data, applications, or devices. Such security policies determine with actions a device may be allowed or not allowed to take. In various implementations, a security policy applies one or more rules for allocating one or more network resources. A security policy may involve one or more rules. Also, a security policy may include a group of policies.

In various implementations, the system provides security policies based on threat levels of a client device. In various implementations, client devices having low threat levels may be classified as having a threat index value of green, client devices having medium threat levels may be classified as having a threat index value of yellow, and client devices having high threat levels may be classified as having a threat index value of red. As described in more detail herein, these threat indexes may be leveraged for intelligent security decisions.

At 208, the system determines allocation of one or more of the network resources to the client device based on the one or more security policies and the threat index value. In some implementations, a client device that is termed as a low threat (e.g., a low threat index value) may be permitted access to a larger number of network resources that another client device that is termed a high threat, e.g., having a high thread index value. In some implementations, threat index values may vary base on various factors such as deployment location, time of day, day of the week, seasonal factors, etc.

In some implementations, security policy for a network resource may specify a threat index value for a client device to be granted access to the network resource. As described in more detail herein, in various implementations, different thresholds may be assigned based on the particular resource or resources (e.g., VLAN, bandwidth, types of data, airtime fairness allocation, steering). Other resources may include network or network resources available to client devices (e.g., IoT devices, file server, printers, fax machine, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following implementations apply security policies to various network resources based on threat index. As described in more detail herein, implementations provide threat index based VLAN assignments, threat index based band steering, threat index based airtime fairness, and threat index based SSID steering. While implementations are described herein in the context of these example resources, these implementations and others may also apply to other types of network resources. The particular network resources to which security policies are applied may vary and will depend on the particular implementation. While implementations are described herein in the context of hubs or switches, these implementations and others may also apply to other types of network nodes or devices such as wireless access points.

Figure 3:
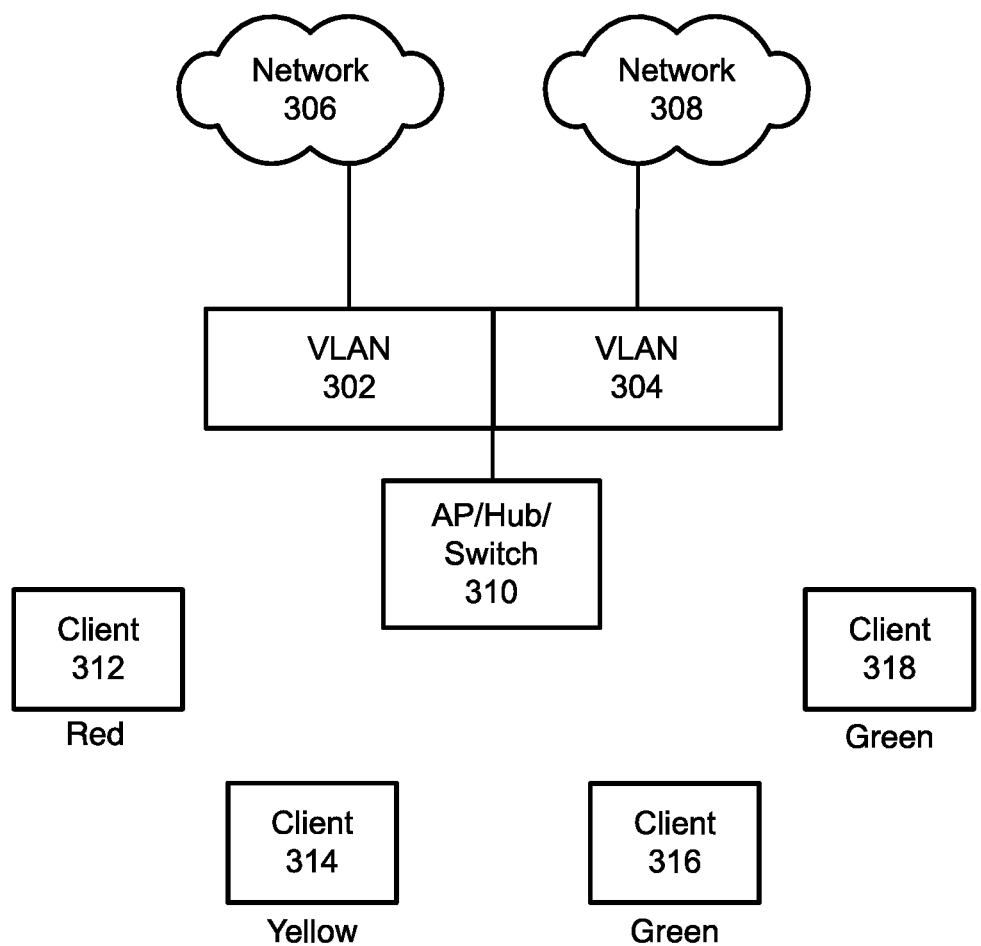
FIG. 3 illustrates a wireless network environment where threat index based VLAN assignments are provided, according to some implementations.

FIG. 3 illustrates a wireless network environment 300 where threat index based VLAN assignments are provided, according to some implementations. As shown, the wireless network environment 300 includes VLAN 302 and VLAN 304. VLAN 302 connects to a network 306, and VLAN 304 connects to a network 308. Also shown is an AP or hub or switch 310, which communicates with the VLAN 302 and the VLAN 304. The AP/hub/switch 310 enables wireless clients access to the VLAN 302 and the VLAN 304. Such clients may include client 312, client 314, client 316, and client 318, for example. In other implementations, the wireless network environment 300 may not have all of the components shown and/or may have other elements including other types of elements instead of, or in addition to, those shown herein.

In various implementations, one of the network resources that the system allocates includes VLAN assignments. In some implementations, the system may apply one of the security policies to the VLAN assignments based on the threat index value. In various implementations, the system may use security policies to assign VLANs of varying levels of service access to the respective clients 312-318 based on their respective threat index values.

For example, in some implementations, a security policy may specify that a system assign clients with a threat index value of green to a VLAN with access to all services or all data. For example, the client 316 and the client 318, each having a threat index value of green, may be granted access to all services or all data. A security policy may specify that a system assign clients with a threat index value of yellow to a VLAN with access to only to a limited number of services. For example, the client 314 having a threat index value of yellow may be granted access to a security server for antivirus updates and threat removal tools as well as low security resources such as the public internet or VOIP servers. The clients 316 and 318, each having a threat index value of green, may also have access to antivirus updates and threat removal tools as well as the low security resources and high security resources such as enterprise file servers or application servers. A security policy may specify that a system assign clients with a threat index value of red to a VLAN with access only to the security server for antivirus updates and threat removal tools or to no other services. For example, a security policy may specify that the client 312 having a threat index value of red may be blocked from all services and data.

Figure 4:
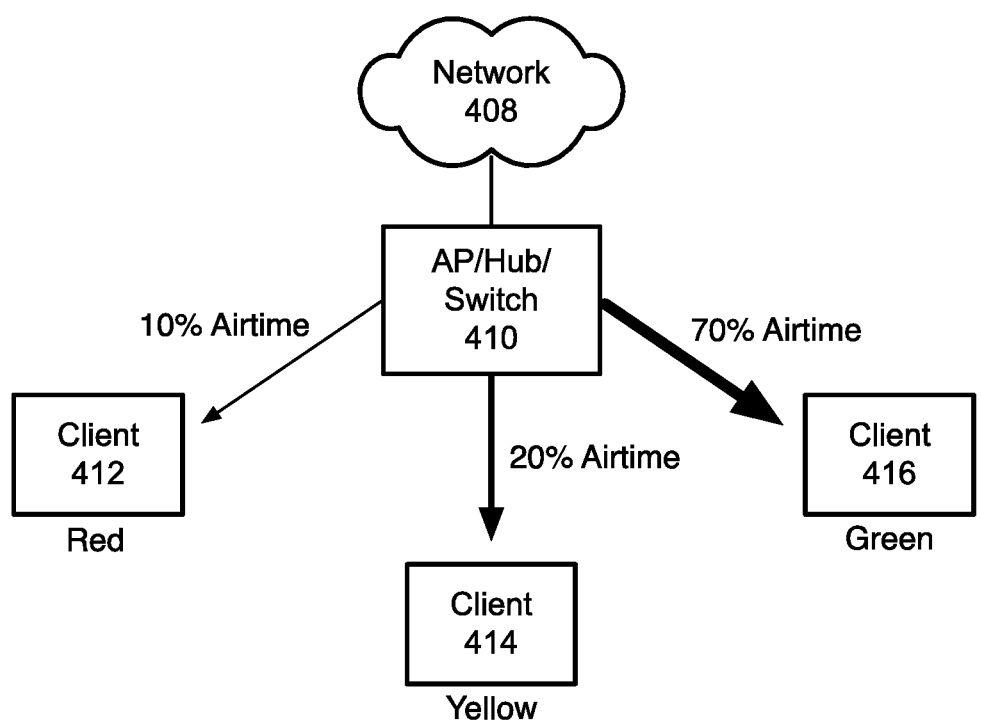
FIG. 4 illustrates a wireless network environment where threat index based airtime fairness allocation is provided, according to some implementations.

FIG. 4 illustrates a wireless network environment 400 where threat index based airtime fairness allocation is applied, according to some implementations. As shown, the wireless network environment 400 includes a network 408, and an AP or hub or switch 410 that connects to the network 408. Also shown are client 412, client 414, and client 416, which connect to the AP/hub/switch 410. In other implementations, the wireless network environment 400 may not have all of the components shown and/or may have other elements including other types of elements instead of, or in addition to, those shown herein.

In some implementations, one of the network resources that the system allocates may include airtime. In some implementations, the system may apply one of the security policies to airtime allocation based on the threat index value. In various implementations, airtime fairness allocation allows some clients (e.g., safe clients) to have more airtime than other clients (e.g., unsafe clients) or limits clients that are deemed as threats lower airtime than other clients.

In some implementations, a security policy control downlinks airtime to clients based on their threat index value. In some implementations, a security policy may specify that the system provide more airtime and bandwidth to clients with a threat index value of green. For example, the client 416 having a threat index value of green may be granted 70% airtime. In some implementations, a security policy may specify that the system provide less airtime to clients with a threat index value of yellow. For example, the client 414 having a threat index value of yellow may be granted 20% airtime. In some implementations, a security policy may specify that the system provide airtime only if there is no load on the AP for clients with a threat index value of red. For example, the client 412 having a threat index value of red may be granted 10% airtime, or less. The particular percentage of airtime associated with a given threat index value may vary and will depend on the particular implementation. In various implementations, different resources described herein may be allocated based on combinations of security policies. For example, airtime may be allocated in combination with wireless channel allocation and/or VLAN assignment based on one or more security policies. Various combinations of applied security policies are possible, depending on the particular implementation.

Figure 5:
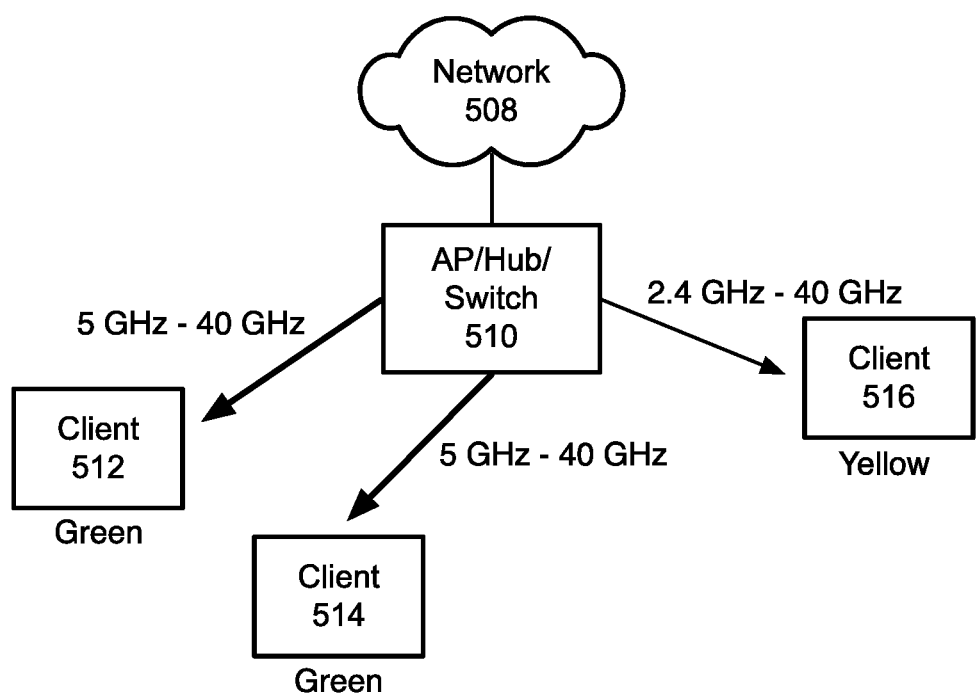
FIG. 5 illustrates a wireless network environment where threat index based band/access point steering is provided, according to some implementations.

FIG. 5 illustrates a wireless network environment 500 where threat index based band/AP steering is provided, according to some implementations. As shown, the wireless network environment 500 includes a network 508, and includes an AP or hub or switch 510 that connects to the network 508. Also shown are client 512, client 514, and client 516, which connect to the AP/hub/switch 510. In other implementations, the wireless network environment 500 may not have all of the components shown and/or may have other elements including other types of elements instead of, or in addition to, those shown herein.

In some implementations, one of the network resources that the system allocates may include band steering. In some implementations, the system may apply one of the security policies to band steering based on the threat index value. In some implementations, security policies move particular clients to particular frequency bands based on their threat index value. In some implementations, a security policy may specify that the system assign clients with a threat index value of green to a band with optimal WLAN channel utilization. For example, the client 512 and the client 514, each having a threat index value of green, may be moved to a frequency band of 2.4 GHz-40 Mhz. In some implementations, a security policy may specify that a system assign clients with a threat level index of yellow to a band having moderate WLAN channel utilization. For example, the client 516 having a threat index value of yellow may be moved to a frequency band of 2.4 GHz-40 Mhz.

While some implementations herein have been described in the context of a color-coding scheme for threat index values, other schemes are possible. For example, in some implementations, the threat index value may be a number that falls within a predetermined range (e.g., 1 through 5), where a number (e.g., 1) on one end of the range indicates a safe client device, and a number (e.g., 5) on the other end of the range indicates an unsafe client device. In some implementations, a number on the higher end of a range (e.g., 5) may indicate a safe client, and a number on the lower end of the range (e.g., 1) may indicate an unsafe client. The particular scheme may vary and will depend on the particular implementation. Also, the particular number range may vary and will depend on the particular implementation.

Figure 6:
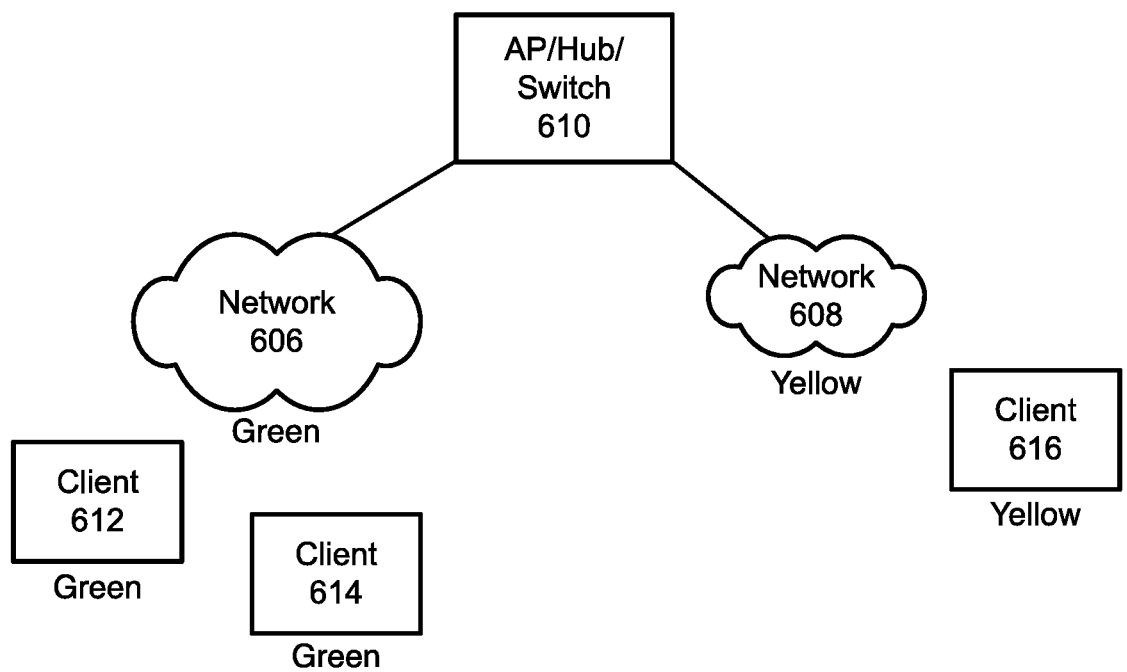
FIG. 6 illustrates a wireless network environment where threat index based service set SSID steering is provided, according to some implementations.

FIG. 6 illustrates a wireless network environment 600 where threat index based SSID steering is provided, according to some implementations. As shown, the wireless network environment 600 includes a network 606, a network 608, and an AP or hub or switch 610 that connects to the network 606 and the network 608. Also shown are client 612, client 614, and client 416, which connect to the AP/hub/switch 610 via the network 606 and the network 608, respectively. In other implementations, the wireless network environment 600 may not have all of the components shown and/or may have other elements including other types of elements instead of, or in addition to, those shown herein.

In some implementations, one of the network resources that the system allocates may include SSID steering. In some implementations, the system may apply one of the security policies to the SSID steering based on the threat index value. In some implementations, a security policy may specify that clients with particular preconfigured WLAN profiles be assigned or moved to particular SSIDs based on their threat indexes values.

In some implementations, the threat level may correlate with a reliability index, where a client device with a higher reliability index has a lower threat level, and is thus deemed a safer device. In contrast, a client device with a lower reliability index has a higher threat level, and is thus deemed a less safe device.

In some implementations, a machine learning model may be used to identify a client device based on physical characteristics associated with the device. For example, a machine learning model may be used to provide a reliability index for a device, a type of devices, or a class of devices. In some implementations, a machine learning model may be used instead of or in addition to rules, indices, thresholds, etc.

In some implementations, detected physical characteristics of a device, a type or types of devices, or a class of devices may be provided to a machine learning model generator, such as a deep neural network (DNN) machine learning model generator, to construct models that may be used to identify a device. A DNN model transforms inputs using succession calculation layers to produce an output, where each layer contains a number of weights, biases, and activation functions. The calculations may be performed relatively quickly and may be optimized for a particular architecture. A series of time-based inputs may be provided to a classifier so that multiple "snapshots" of detected features may used to identify a device as those features change over time. An open source DNN tool such as Theano may be used to build DNN models.

Instantiations of a DNN model may have a variety of action functions, for example, linear or hyperbolic tangent action functions. In addition to determining activation functions that give the best performance, L1 and L2 regularization functions may be used to improve a DNN model's recognition capability, to penalize large weights and reduce non-linear behavior.

In some implementations, training data for a device is collected. The training data may include one or more feature vectors, where the feature vectors may be or may be based on the detected hardware characteristics described above. The feature vectors may be classified such that a desired output (e.g., which device they are associated with) is provided for the training data. A machine learning system thus may be trained using the feature vectors.

Any suitable machine learning technique may be used instead of or in addition to DNN, including, by way of non-limiting examples, support vector machines, quadratic classifiers, kernel estimation (e.g., k-nearest-neighbor classifiers) and decision trees. Techniques for training may vary, depending on the machine learning technique used. A result of training is a properly trained machine learning model that is ready to identify a device, a type of device, or a class of devices, or to provide a reliability index for a device or type of device.

In some implementations, communications of a device may be monitored to identify software that is running on the device. For example, the version of a protocol supported by a device may be indicated explicitly by a device in a protocol exchange, or may be inferred based on the data sent by the device. For example, a version of DHCP or TCP/IP may be indicated or inferred in communication with the device. Likewise, a version of TLS or another encryption protocol may be indicated or may be inferred by the communication exchange with the device. This information may be used in combination with physical characteristics to identify a device.

In some implementations, management information, such as software version information, hardware version information, etc. may be requested from a device. For example, if a device supports simple network management protocol (SNMP), certain information may be requested. This information may be used in combination with physical characteristics to identify a device. In some implementations, a device may provide a management web page that includes software or hardware version information. Responses of a device to queries may be used to identify a device and to determine threat levels.

In some implementations, a device may provide a response to communications to the device. For example, a printer may provide a specific response to a status request made to a port that supports a printing protocol supported by the printer. For example, a printer may provide a response that indicates that the printer is available and ready to receive a print request. A query to that port may provide a response that can be compared to expected responses or previous responses to identify a device.

In some implementations, the types and sizes or content of packets communicated by a device may be monitored determine threat levels. Communication patterns, such as with respect to devices and ports on the network communicated with, the types of packets communicated, the data in those packets, etc. may be used to identify a device. A device characteristic, or threat level associated with a device, may be determined. For example, if a device with different hardware characteristics than expected starts communicating to different addresses, or, for example, conducts a port scan of another device on the network, this may be indicative of a characteristic or a threat level.

In some implementations, data communicated by a device may be used to assist in analysis of hardware characteristics and to determine threat levels. For example, a packet of data sent periodically by the device (whether part of a security protocol or for other purposes) may be monitored. A packet sent at a different time that also has different hardware characteristics may be indicative of a concern.

In some implementations, a "heartbeat" may be used by a device to securely communicate health information and other information, and a correctly authenticated heartbeat may be used to have more confidence in a device even if the device presents irregular hardware characteristics. As such, a heartbeat may be used to determine threat levels. In some implementations, the heartbeat may be secured with encryption, or use hash or other one-way functions to provide authentication.

Figure 7:
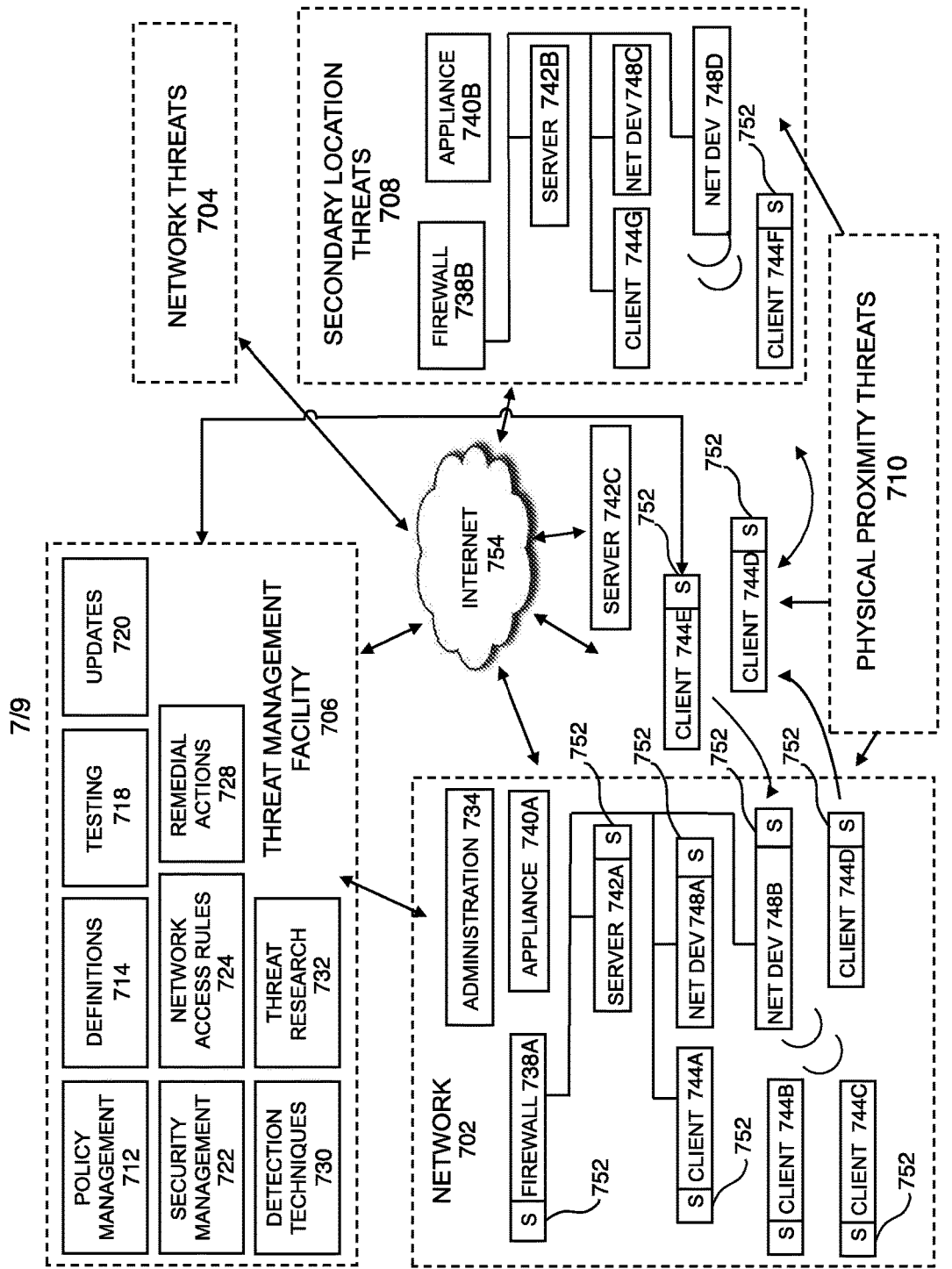
FIG. 7 illustrates a block diagram of an example threat management system, according to some implementations.

FIG. 7 illustrates a block diagram of an example threat management system 700, according to some implementations. As shown, in some implementations, the threat management system 700 may include a network 702. As described in more detail herein, various threats to client facilities may come from a variety of sources, such as from network threats 704. In various implementations, a threat management facility 706 may provide protection against such network threats 704, as well as other threats including secondary location threats 708 and physical proximity threats 710. Various threat management system 700 components such as implementations, network 702, threat management facility 706, etc.

In various implementations, the threat management facility 706 provides protection to one or more enterprises, networks, locations, users, businesses, and other network elements against a variety of threats, in a context in which the techniques described above may usefully be deployed. The threat management facility 706 may be used to protect devices and assets (e.g., IoT devices or other devices) from computer-generated and human-generated threats. For example, a corporation, school, web site, homeowner, network administrator, or other entity may institute and enforce one or more policies that control or prevent certain network users (e.g., employees, residents, users, guests, etc.) from accessing certain types of applications, devices, resources generally or in a particular manner. Policies may be created, deployed and managed, for example, through the threat management facility 706, which may update and monitor network devices, users, and assets accordingly.

The threat of malware or other compromise may be present at various points within a network 702 such as laptops, desktops, servers, gateways, communication ports, handheld or mobile devices, IoT devices, and/or firewalls. In addition to controlling or stopping malicious code, a threat management facility 706 may provide policy management to control devices, applications, or users that might otherwise undermine productivity and network performance within the network 702.

The threat management facility 706 may provide protection to network 702 from computer-based malware, including viruses, spyware, adware, trojans, intrusion, spam, policy abuse, advanced persistent threats, uncontrolled access, and the like. In general, the network 702 may be any networked computer-based infrastructure or the like managed by the threat management facility 706, such as an organization, association, institution, or the like, or a cloud-based facility that is available for subscription by individuals. For example, the network 702 may be a corporate, commercial, educational, governmental, or other network, and may include multiple networks, computing resources, and other facilities, may be distributed among more than one geographical location, and may include an administration unit 734, a firewall 738A, an appliance 740A, a server 742A, network devices 748A-B, clients 744A-D (alternately referred to as clients 744), such as IoT devices or other devices. It will be understood that any reference herein to a wireless client device, client device, or client facilities may include the clients 744A-D, and vice-versa.

The threat management facility 706 may include computers, software, or other computing facilities supporting a plurality of functions, such as a security management facility 722, a policy management facility 712, an update facility 720, a definitions facility 714, a network access rules facility 724, a remedial actions facility 728, a detection techniques facility 730, a testing facility 718, a threat research facility 732, and the like. In some implementations, the threat protection provided by the threat management facility 706 may extend beyond the network boundaries of the network 702 to include client 744D (or client facilities) that have moved into network connectivity not directly associated with or controlled by the network 702. Threats to client facilities may come from a variety of sources, such as from network threats 704, physical proximity threats 710, secondary location threats 708, and the like. Clients 744A-D may be protected from threats even when clients 744A-D are not directly connected or in association with the network 702, such as when client 744E-F moves in and out of the network 702, for example when interfacing with an unprotected server 742C through the Internet 754, when a client 744F is moving into a secondary location threat 708 network such as interfacing with components 740B, 742B, 748C, 748D that are not protected, and the like.

The threat management facility 706 may use or may be included in an integrated system approach to provide network 702 protection from multiple threats to device resources in multiple of locations and network configurations. The threat management facility 706 may also or instead be deployed as a stand-alone solution. For example, some or all of the threat management facility 706 components may be integrated into a server or servers at a remote location, for example in a cloud computing facility. For example, some or all of the threat management facility 706 components may be integrated into a firewall, gateway, or access point within or at the border of the network 702. In some implementations, the threat management facility 706 may be integrated into a product, such as a third-party product, e.g., through an application programming interface, which may be deployed on endpoints, on remote servers, on internal servers or gateways for a network, or some combination of these.

The security management facility 722 may include a plurality of elements that provide protection from malware to network 702 device resources in a variety of ways including endpoint security and control, email security and control, web security and control, reputation-based filtering, control of unauthorized users, control of guest and non-compliant computers, and the like. The security management facility 722 may include a local software application that provides protection to one or more network 702 devices. The security management facility 722 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 722 may provide email security and control. The security management facility 722 may also or instead provide for web security and control, such as by helping to detect or block viruses, spyware, malware, unwanted applications, and the like, or by helping to control web browsing activity originating from client devices. In some implementations, the security management facility 722 may provide for network access control, which may provide control over network connections. In addition, network access control may control access to virtual private networks (VPN) that provide communications networks tunneled through other networks. The security management facility 722 may provide host intrusion prevention through behavioral based protection, which may guard against known or unknown threats by analyzing behavior before or while code executes. The security management facility 722 may provide reputation filtering, which may target or identify sources of code.

In some implementations, the security management facility 722 may use wireless characteristics to identify a device on the network 702. For example, the security management facility may determine a reliability index value of a device connected via a wireless link to the network 702, for example, an IoT device. Through one or more access points (e.g., firewall 738A) or other sensor (e.g., appliance 740A) in the network 702, the security management facility 722 may monitor RF characteristics of the IoT device to obtain current RF characteristics. The security management facility 722 may compare the current RF characteristics to baseline RF characteristics, and when there is a match between the current RF characteristics and the baseline RF characteristics based on the comparing, adjust the reliability index value to indicate greater reliability, and when there is not a match between the current RF characteristics and the baseline RF characteristics based on the comparing, adjusting the reliability index value to indicate lesser reliability, and when the reliability index value exceeds a threshold value, performing an action to reduce a potential threat of the IoT device to the network. This aspect of the security management facility may also take place on the firewall 738A (e.g., an access point) or appliance 740A.

In general, the security management facility 722 may support overall security of the network 702 using the various techniques described above, optionally as supplemented by updates of malicious code information and so forth for distribution across the network 702.

The administration facility 734 may provide control over the security management facility 722 when updates are performed. Information from the security management facility 722 may also be sent from the enterprise back to a third party, a vendor, or the like, which may lead to improved performance of the threat management facility 706.

The policy management facility 712 may be configured to take actions, such as to block applications, users, communications, devices, and so on based on determinations made. The policy management facility 712 may employ a set of rules or policies that determine network 702 access permissions for a client 744. In some implementations, a policy database may include a block list, a black list, an allowed list, a white list, or the like, or combinations of the foregoing, that may provide a list of resources internal or external to the network 702 that may or may not be accessed by client devices 744. The policy management facility 712 may also or instead include rule-based filtering of access requests or resource requests, or other suitable techniques for controlling access to resources consistent with a corresponding policy.

In some implementations, the policy management facility 712 may include reliability index thresholds for devices, such as IoT devices. The policy management facility 712 may include policies to permit or deny access, to take remedial action, to issue alerts, and so on based on particular reliability index determinations.

The policy management facility 712 may also or instead provide configuration policies to be used to compare and control the configuration of applications, operating systems, hardware, devices, network associated with the network 702. An evolving threat environment may dictate timely updates, and thus an update management facility 720 may also be provided by the threat management facility 706. In addition, the policy management facility 712 may require update management (e.g., as provided by the update facility 720 herein described). In some implementations, the update management facility 720 may provide for patch management or other software updating, version control, and so forth.

The security management facility 722 and the policy management facility 712 may push information to the network 702 and/or a given client 744. The network 702 and/or client 744 may also or instead request information from the security management facility 722 and/or the policy management facility 712, network access rules facilities 742 (e.g., 742A, 742B), or there may be a combination of pushing and pulling of information. In some implementations, the policy management facility 712 and the security management facility 722 management update modules may work in concert to provide information to the network 702 and/or client facility 744 for control of applications, devices, users, and so on.

As threats are identified and characterized, the threat management facility 706 may create updates that may be used to allow the threat management facility 706 to detect and remediate malicious software, unwanted applications, configuration and policy changes, and the like. The threat definition facility 714 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 722 when scanning files or applications within the client facility for the determination of malicious code that may be within the file or application. A definition management facility may include a definition for a neural network or other recognition engine. A definition management facility 714 may provide timely updates of definition files information to the network, client facilities, and the like.

In some implementations, the definition management facility 714 may include default values or baseline values for RF characteristics of devices, such as IoT devices. For example, the definition management facility 714 may include a baseline value for particular RF characteristics of a particular IoT device.

The security management facility 722 may be used to scan an outgoing file and verify that the outgoing file is permitted to be transmitted per the enterprise facility 702 rules and policies. By checking outgoing files, the security management facility 722 may be able to discover malicious code infected files that were not detected as incoming files.

The threat management facility 706 may provide controlled access to the network 702. A network access rules facility 724 may be responsible for determining if a client facility 744 application should be granted access to a requested network resource. In some implementations, the network access rules facility 724 may verify access rights for client facilities 744 to or from the network 702 or may verify access rights of computer facilities to or from external networks. When network access for a client facility is denied, the network access rules facility 724 may send an information file to the client facility, e.g., a command or command file that the remedial actions facility 728 may access and take action upon. The network access rules facility 724 may include one or more databases that may include a block list, a black list, an allowed list, a white list, a reputation list, an unacceptable network resource database, an acceptable network resource database, a network resource reputation database, or the like. The network access rules facility 724 may incorporate rule evaluation. Rule evaluation may, for example, parse network access requests and apply the parsed information to network access rules. The network access rules facility 724 may also or instead provide updated rules and policies to the network 702.

When a threat or policy violation is detected by the threat management facility 706, the threat management facility 706 may perform or initiate remedial action through a remedial actions facility 728. Remedial action may take a variety of forms, such as terminating or modifying an ongoing process or interaction, issuing an alert, sending a warning to a client or administration facility 734 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on a client 744, quarantining a related application (or files, processes or the like), terminating the application or device, isolating the application or device, moving a process or application code to a sandbox for evaluation, isolating a client 744 to a location or status within the network that restricts network access, blocking a network access port from a client 744, reporting the application to an administration facility 734, or the like, as well as any combination of the foregoing.

In some implementations, remedial action may be taken based on a reliability index determination based on RF characteristics of a wireless device.

Remedial action may be provided as a result of a detection of a threat or violation. The detection techniques facility 730 may include tools for monitoring the network or managed devices within the network 702. The detection techniques facility 730 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 706 may detect threats and violations to established policy and may specify the ability to test the system, either at the system level or for a particular computing component. The testing facility 718 may allow the administration facility 734 to coordinate the testing of the security configurations of client facility computing facilities on a network. For example, the administration facility 734 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 734. The administration facility 734 may be able to determine the level of preparedness of clients 744 based on the reported information. Remedial action may be taken for any of clients 744 as determined by the administration facility 734.

The threat management facility 706 may provide threat protection across the network 702 to devices such as clients 744, a server facility 742, an administration facility 734, one or more firewalls 738 (e.g., 738A, 738B), a gateway, one or more network devices 748 (e.g., 748A, 748B) such as hubs and routers, a threat management or other appliance 740 (e.g., 740A, 740B), any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 702, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 108. The endpoint computer security facility 752 may be an application locally loaded onto any corresponding computer platform or computer support component, either for local security functions or for management by the threat management facility 706 or other remote resource, or any combination of these.

The network 702 may include a plurality of client facility computing platforms on which the endpoint computer security facility 752 is installed. A client facility computing platform may be a computer system that is able to access a service on another computer, such as a server facility 742, via a network. The endpoint computer security facility 752 may, in corresponding fashion, provide security in any suitable context such as among a plurality of networked applications, for a client facility connecting to an application server facility 742, for a web browser client facility connecting to a web server facility 742, for an e-mail client facility retrieving e-mail from an Internet 754 service provider's mail storage servers 742 or web site, and the like, as well as any variations or combinations of the foregoing.

The network 702 may include one or more of a variety of server facilities 742, such as application servers, communications servers, file servers, database servers, proxy servers, mail servers, fax servers, game servers, web servers, and the like. A server facility 742, which may also be referred to as a server facility 742 application, server facility 742 operating system, server facility 742 computer, or the like, may be any device(s), application program(s), operating system(s), or combination of the foregoing that accepts client facility connections in order to service requests from clients 744. In some implementations, the threat management facility 706 may provide threat protection to server facilities 742 within the network 702 as load conditions and application changes are made.

A server facility 742 may include an appliance facility 740, where the appliance facility 740 provides specific services to other devices on the network. Simple server facility 742 appliances may also be utilized across the network 702 infrastructure, such as switches, routers, hubs, gateways, print servers, modems, and the like. These appliances may provide interconnection services within the network 702, and therefore may advance the spread of a threat if not properly protected.

A client facility 744 may be protected from threats from within the network 702 using a local or personal firewall, which may be a hardware firewall, software firewall, or combination, that controls network traffic to and from a client. The local firewall may permit or deny communications based on a security policy. Another component that may be protected by an endpoint computer security facility 752 is a network firewall facility 738, which may include hardware or software, in a standalone device or integrated with another network component, that may be configured to permit, deny, or proxy data through a network 702.

The interface between the threat management facility 706 and the network 702, and through the appliance facility 740 to embedded endpoint computer security facilities, may include a set of tools that may be the same or different for various implementations, and may allow each network administrator to implement custom controls. In some implementations, these controls may include both automatic actions and managed actions. The administration facility 734 may configure policy rules that determine interactions. The administration facility 734 may also establish license management, which in turn may further determine interactions associated with licensed applications. In some implementations, interactions between the threat management facility 706 and the network 702 may provide threat protection to the network 702 by managing the flow of network data into and out of the network 702 through automatic actions that may be configured by the threat management facility 706 for example by action or configuration of the administration facility 734.

Client facilities 744 within the network 702 may be connected to the network 702 by way of wired network facilities 748A or wireless network facilities 748B. Mobile wireless facility clients 744, because of their ability to connect to a wireless network access point, may connect to the Internet 754 outside the physical boundary of the network 702, and therefore outside the threat-protected environment of the network 702. Such a client 744, if not for the presence of a locally-installed endpoint computer security facility 752, may be exposed to a malware attack or perform actions counter to network 702 policies. Thus, the endpoint computer security facility 752 may provide local protection against various threats and policy violations. The threat management facility 706 may also or instead be configured to protect the out-of-enterprise facility 702 mobile client facility (e.g., the clients 744) through interactions over the Internet 754 (or other network) with the locally-installed endpoint computer security facility 752. Thus, mobile client facilities that are components of the network 702 but temporarily outside connectivity with the network 702 may be provided with the threat protection and policy control the same as or similar to client facilities 744 inside the network 702. In addition, mobile client facilities 744 may receive the same interactions to and from the threat management facility 706 as client facilities 744 inside the enterprise facility 702, such as by receiving the same or equivalent services via an embedded endpoint computer security facility 752.

Interactions between the threat management facility 706 and the components of the network 702, including mobile client facility extensions of the network 702, may ultimately be connected through the Internet 754 or any other network or combination of networks. Security-related or policy-related downloads and upgrades to the network 702 may be passed from the threat management facility 706 through to components of the network 702 equipped with the endpoint computer security facility 752. In turn, the endpoint computer security facility 752 components of the enterprise facility 700 may upload policy and access requests back across the Internet 754 and through to the threat management facility 706. The Internet 754 however, is also the path through which threats may be transmitted from their source, and an endpoint computer security facility 752 may be configured to protect a device outside the network 702 through locally-deployed protective measures and through suitable interactions with the threat management facility 706.

Thus, if the mobile client facility were to attempt to connect into an unprotected connection point, such as at a secondary location 708 hat is not a part of the network 702, the mobile client facility 744 may be required to request network interactions through the threat management facility 706, where contacting the threat management facility 706 may be performed prior to any other network action. In some implementations, the client facility's 744 endpoint computer security facility 752 may manage actions in unprotected network environments such as when the client facility (e.g., client 744F) is in a secondary location 708, where the endpoint computer security facility 752 may dictate what applications, actions, resources, users, etc. are allowed, blocked, modified, or the like.

The secondary location 708 may have no endpoint computer security facilities 752 as a part of its components, such as its firewalls 738B, servers 742B, clients 744G, hubs and routers 748C-D, and the like. As a result, the components of the secondary location 708 may be open to threat attacks, and become potential sources of threats, as well as any mobile enterprise facility clients 744B-F that may be connected to the secondary location's 708 network. In this instance, these components may now unknowingly spread a threat to other connected to the network 702.

Some threats do not come directly from the Internet 754. For example, a physical proximity threat 710 may be deployed on a client device while that device is connected to an unprotected network connection outside the enterprise facility 702, and when the device is subsequently connected to a client 744 on the network 702, the device can deploy the malware or otherwise pose a threat. In some implementations, the endpoint computer security facility 752 may protect the network 702 against these types of physical proximity threats 710, for instance, through scanning any device prior to allowing data transfers, through security validation certificates, through establishing a safe zone within the network 702 to receive data for evaluation, and the like.

Figure 8:
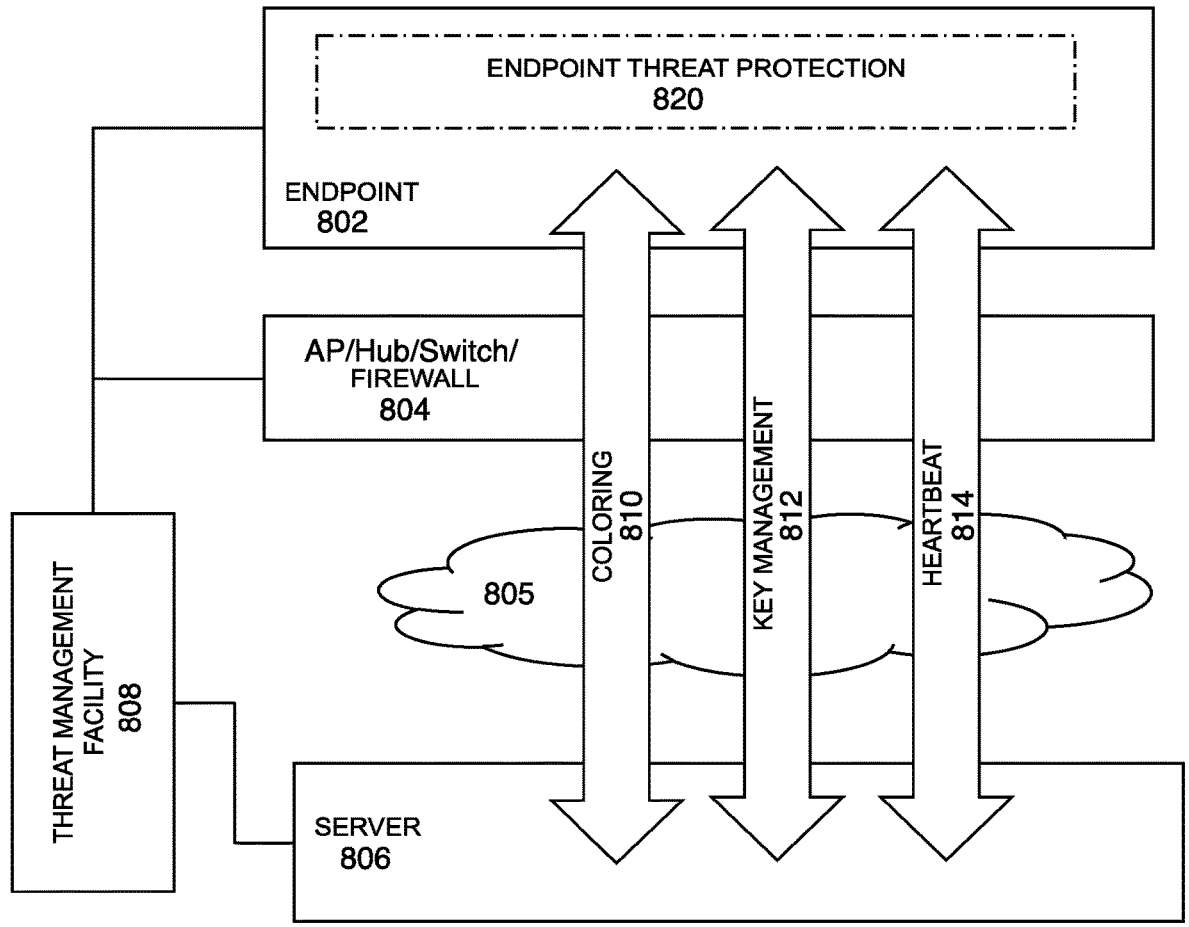
FIG. 8 illustrates a block diagram of an example threat management system, according to some implementations.

FIG. 8 illustrates a block diagram of an example threat management system 800, according to some implementations. In general, the threat management system 800 may include an endpoint 802, a laptop, or a device such as an IoT device, an AP or hub or switch or firewall 804, a server 806, and a threat management facility 808 in communication with one another directly or indirectly through a data network 805. In various implementations, each of the entities depicted in FIG. 8, may be implemented on one or more computing devices such as the computing device described herein with reference to FIG. 9.

A number of systems may be distributed across these various components to support threat management, for example, including a coloring system 810, a key management system 812 and a heartbeat system 814, each of which may include software components executing on any of the foregoing system components, and each of which may communicate with the threat management facility 808 or an endpoint threat protection system 820 executing on the endpoint 802, on the AP/hub/switch/firewall 804, or on the server 806 to support improved threat detection and remediation.

The coloring system 810 may be used to label or 'color' software objects for improved tracking and detection of a potentially harmful activity. The coloring system 810 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 810 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy. A color of a device may be considered a characteristic of a device. A color of a device may be a threat level, indicative of a threat level, or used to determine a threat level.

The key management system 812 may support management of keys for the endpoint 802 in order to selectively permit or prevent access to content on the endpoint 802 on a file-specific basis, a process-specific basis, an application-specific basis, a user-specific basis, or any other suitable basis in order to prevent data leakage, and in order to support more fine-grained and immediate control over access to content on the endpoint 802 when a security compromise is detected. Thus for example, if a particular process executing on the endpoint is compromised, or potentially compromised or otherwise under suspicion, keys to that process may be revoked in order to prevent, e.g., data leakage or other malicious activity. In implementations, keys on device may be revoked based on one or more reliability index values, the meeting of one or more reliability index thresholds, the rate of change of one or more reliability index values, etc. A key status of a device may be considered a characteristic of a device. A key status of a device may be a threat level, indicative of a threat level, or used to determine a threat level.

The heartbeat system 814 may be used to provide periodic or aperiodic information from an endpoint about system health, security, status, etc. A heartbeat may be encrypted or plaintext, or some combination of these, and may be communicated unidirectionally (e.g., from the endpoint 802 to the threat management facility 808) or bidirectionally (e.g., between the endpoint 802 and the server 806, or any other pair of system components) on a useful schedule.

In implementations, the AP/hub/switch/firewall 804 may use the heartbeat 814 to report a potential or actual compromise of a device based, for example, on a color of the device, or based on one or more reliability index values, the meeting of one or more reliability index thresholds, the rate of change of one or more reliability index values, etc. The heartbeat 814 from the AP/hub/switch/firewall 804 may be communicated to the server 806, for example, and administrative server or directly or indirectly to the threat management facility 808. If the endpoint device 802 has the endpoint threat protection system 820, the endpoint threat protection system 820 may be used to further investigate the status, or to take remedial measures, again by communication using the secure heartbeat system 814. Data communicated in a heartbeat may be considered a characteristic of a device. Data communicated in a heartbeat may be a threat level, indicative of a threat level, or used to determine a threat level.

In general, these various monitoring and management systems may cooperate to provide improved threat detection and response. For example, the coloring system 810 may be used to evaluate when a particular device is potentially compromised (e.g., threat level), and a potential compromise may be confirmed based on data received from the heartbeat system 814 from the same or another device or an interrupted heartbeat from the heartbeat system 814. The key management system 812 may be used to revoke keys to a process or to a device so that no further files can be opened, deleted or otherwise modified. The AP/hub/switch may take one or more of the measures described (e.g., VLAN assignment, bandwidth, types of data, airtime fairness allocation, steering). More generally, the cooperation of these systems enables a wide variety of reactive measures that can improve detection and remediation of potential threats to an endpoint device or a network. For example, the combination of a key removal and a VLAN assignment may eliminate the possibility of a malware attack on a network even while allowing the device to function as expected.

Figure 9:
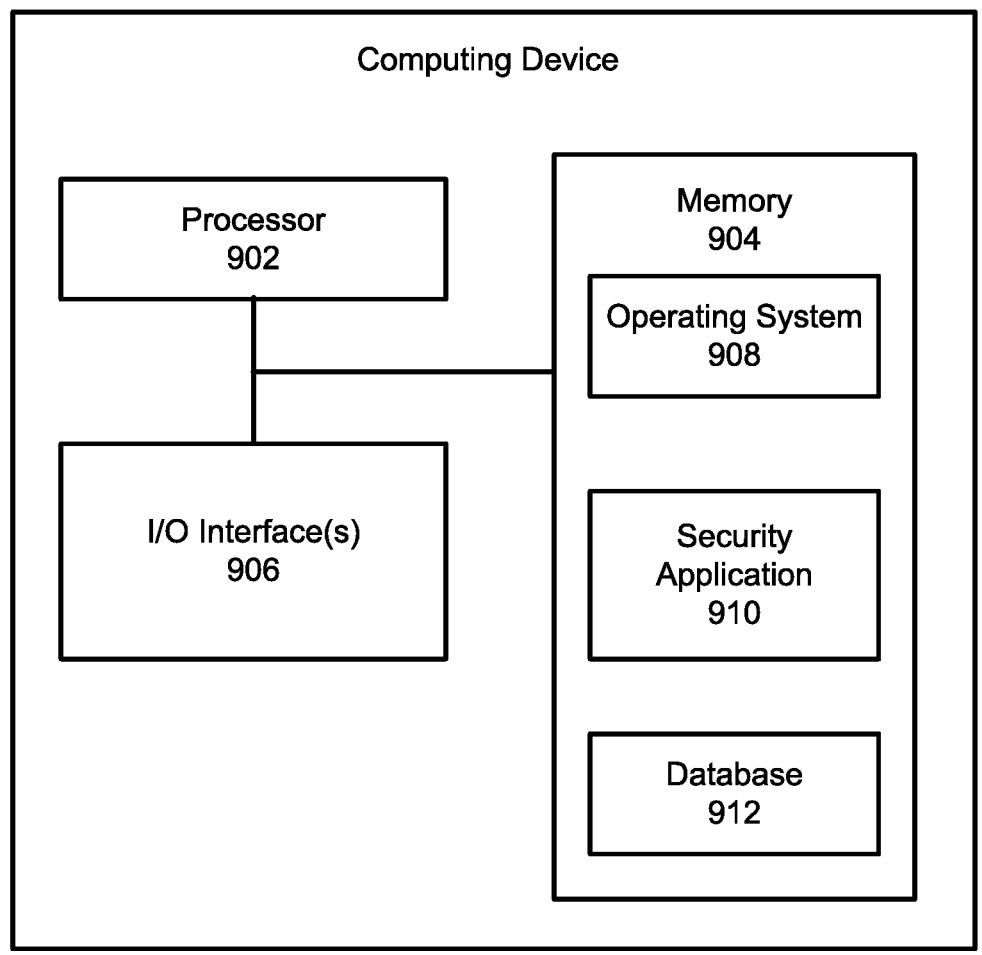
FIG. 9 illustrates a block diagram of an example computing device, which may be used for some implementations described herein.

FIG. 9 illustrates a block diagram of an example computing device 900, which may be used for some implementations described herein. For example, the computing device 900 may be used to various devices of FIGS. 1, 7, and 8, as well as to perform implementations described herein in connection with FIG. 2. In some implementations, the computing device 900 includes one or more processors 902, non-transitory computer readable medium or memory 904, I/O interface devices 906 (e.g., wireless communications, etc.) and a network interface 908. The computer readable medium 904 may include an operating system 908, a security application 910 for detecting a security attack using physical communication layer characteristics and a data section 912 (e.g., for storing baseline data, reliability index data, etc.).

In operation, the processor 902 may execute the application 910 stored in the computer readable medium 904. The application 910 may include software instructions that, when executed by the processor, cause the processor to perform operations for detecting a security attack using physical communication layer characteristics in accordance with the present disclosure (e.g., performing one or more of 502-508 described herein).

The application program 910 may operate in conjunction with the data section 912 and the operating system 908. The device 900 may communicate with other devices (e.g., a wireless access point) via the I/O interfaces 906.

It will be appreciated that the modules, processes, systems, and sections described above may be implemented in hardware, hardware programmed by software, software instructions stored on a non-transitory computer readable medium or a combination of the above. A system as described above, for example, may include a processor configured to execute a sequence of programmed instructions stored on a non-transitory computer readable medium. For example, the processor may include, but not be limited to, a personal computer or workstation or other such computing system that includes a processor, microprocessor, microcontroller device, or includes control logic including integrated circuits such as, for example, an application specific integrated circuit (ASIC), a field-programmable gate array (FPGA), etc. The instructions may be compiled from source code instructions provided in accordance with a programming language such as Java, C, C++, C #, .net, assembly or the like. The instructions may also include code and data objects provided in accordance with, for example, the Visual Basic™ language, or another structured or object-oriented programming language. The sequence of programmed instructions, or programmable logic device configuration software, and data associated therewith may be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random access memory (RAM), flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for implementations above may be distributed across multiple computers or systems or may be co-located in a single processor or system. Example structural implementation alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Implementations of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field programmable gate array (FPGA), programmable array logic (PAL), or the like. In general, any processor capable of implementing the functions or steps described herein may be used for implementations of the method, system, or a computer program product (software program stored on a non-transitory computer readable medium).

Furthermore, implementations of the disclosed method, system, and computer program product (or software instructions stored on a non-transitory computer readable medium) may be readily implemented, fully or partially, in software using, for example, object or object-oriented software development environments that provide portable source code that may be used on a variety of computer platforms. Alternatively, implementations of the disclosed method, system, and computer program product may be implemented partially or fully in hardware using, for example, standard logic circuits or a VLSI design. Other hardware or software may be implemented depending on the speed and/or efficiency requirements of the systems, the particular function, and/or particular software or hardware system, microprocessor, or microcomputer being utilized. The method, system, and computer program product may be implemented in hardware and/or software using any known or later developed systems or structures, devices and/or software by those of ordinary skill in the applicable art from the function description provided herein and with a general basic knowledge of the software engineering and computer networking arts.

While the disclosed subject matter has been described in conjunction with a number of implementations, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Moreover, implementations of the disclosed method, system, and computer readable media (or computer program product) may be implemented in software executed on a programmed general purpose computer, a special purpose computer, a microprocessor, a network server or switch, or the like.

What is claimed is:

1. A computer-implemented method comprising:
   receiving, at a wireless access point, a request from a client device connected to the wireless access point via a wireless link;
   determining a threat index value for the client device based on one or more radio frequency (RF) characteristics of the client device, wherein the one or more RF characteristics comprise an angle of arrival, a beamforming characteristic, or a received signal strength indicator (RSSI);
   selecting one or more security policies associated with one or more respective network resources based at least in part on the threat index value, wherein each security policy includes respective one or more rules for allocation of one of the network resources; and
   allocating one or more of the network resources to the client device based on the one or more security policies.

2. The method of claim 1, wherein determining the threat index value for the client device comprises determining the threat index value based on an identification of the client device, wherein the identification of the client device is based on detected physical characteristics of the client device.

3. The method of claim 1, wherein determining the threat index value for the client device comprises:
   monitoring the one or more RF characteristics of the client device communicating over the wireless link to obtain current RF characteristics;
   comparing the current RF characteristics to baseline RF characteristics; and
   determining the threat index value for the client device based on a match of the current RF characteristics to the baseline RF characteristics.

4. The method of claim 1, wherein one of the network resources includes virtual local area network (VLAN), and wherein the method further comprises applying one of the security policies to VLAN assignments based on the threat index value.

5. The method of claim 1, wherein one of the network resources includes airtime, and wherein the method further comprises applying one of the security policies to airtime allocation based on the threat index value.

6. The method of claim 1, wherein one of the network resources includes band steering, and wherein the method further comprises applying one of the security policies to the band steering based on the threat index value.

7. The method of claim 1, wherein one of the network resources includes service set identifier (SSID) steering, and wherein the method further comprises applying one of the security policies to the SSID steering based on the threat index value.

8. A computer-implemented method comprising:
receiving, at a wireless access point, a request from a client device connected to the wireless access point via a wireless link;
determining, a threat index value for the client device, wherein the threat index value is determined based on an identification of the client device, wherein the identification of the client device is based on detected physical characteristics of the client device;
selecting one or more security policies associated with one or more respective network resources based at least in part on the threat index value, wherein each security policy includes respective one or more rules for allocating one of the network resources; and
allocating one or more of the network resources to the client device based on the one or more security policies.

9. The method of claim 8, wherein the determining the threat index value for the client device further comprises determining the threat index value based on one or more radio frequency (RF) characteristics of the client device, and wherein the one or more RF characteristics comprise an angle of arrival, a beamforming characteristic, or a received signal strength indicator (RSSI).

10. The method of claim 8, wherein the identification of the client device based on the detected physical characteristics of the client device is performed using a machine learning model.

11. The method of claim 10, wherein the machine learning model provides one or more of a reliability index for the client device, a type of the client device, or a class of the client device.

12. The method of claim 8, wherein one of the network resources includes virtual local area network (VLAN), and wherein the method further comprises applying one of the security policies to VLAN assignments based on the threat index value.

13. The method of claim 8, wherein one of the network resources includes airtime, and wherein the method further comprises applying one of the security policies to airtime allocation based on the threat index value.

14. The method of claim 8, wherein one of the network resources includes band steering, and wherein the method further comprises applying one of the security policies to the band steering based on the threat index value.

15. A system comprising:
one or more processors coupled to a computer-readable medium having stored thereon software instructions that, when executed by the one or more processors, cause the one or more processors to perform operations comprising:
receiving, at a wireless access point, a request from a client device connected to the wireless access point via a wireless link;
determining a threat index value for the client device based on one or more radio frequency (RF) characteristics of the client device, wherein the one or more RF characteristics comprise an angle of arrival, a beamforming characteristic, or a received signal strength indicator (RSSI);
selecting one or more security policies associated with one or more respective network resources based at least in part on the threat index value, wherein each security policy includes respective one or more rules for allocating one of the network resources; and
allocating one or more of the network resources to the client device based on the one or more security policies.

16. The system of claim 15, wherein the determining the threat index value for the client device comprises determining the threat index value based on an identification of the client device, wherein the identification of the client device is based on detected physical characteristics of the client device.

17. The system of claim 15, wherein the determining the threat index value for the client device comprises:
monitoring the one or more RF characteristics of the client device communicating over the wireless link to obtain current RF characteristics;
comparing the current RF characteristics to baseline RF characteristics; and
determining the threat index value for the client device based on a match of the current RF characteristics to the baseline RF characteristics.

18. The system of claim 15, wherein one of the network resources includes virtual local area network (VLAN), and wherein the operations further comprise applying one of the security policies to VLAN assignments based on the threat index value.

19. The system of claim 15, wherein one of the network resources includes service set identifier (SSID) steering, and wherein the operations further comprise applying one of the security policies to the SSID steering based on the threat index value.

20. The system of claim 15, wherein one of the network resources includes airtime, and wherein the operations further comprise applying one of the security policies to airtime allocation based on the threat index value.

* * * * *